[37.]
ALONZO F. HAVENS.
Purifying Apparatus for Gas.
No. 118,609. Fig. 1. Patented Aug. 29, 1871.
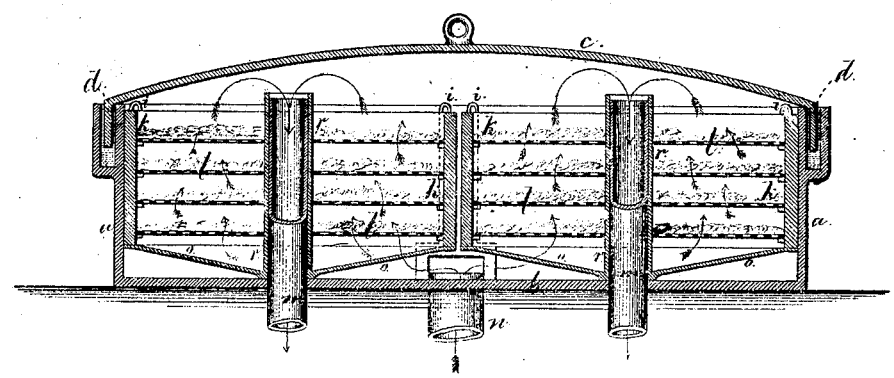
Fig. 2.
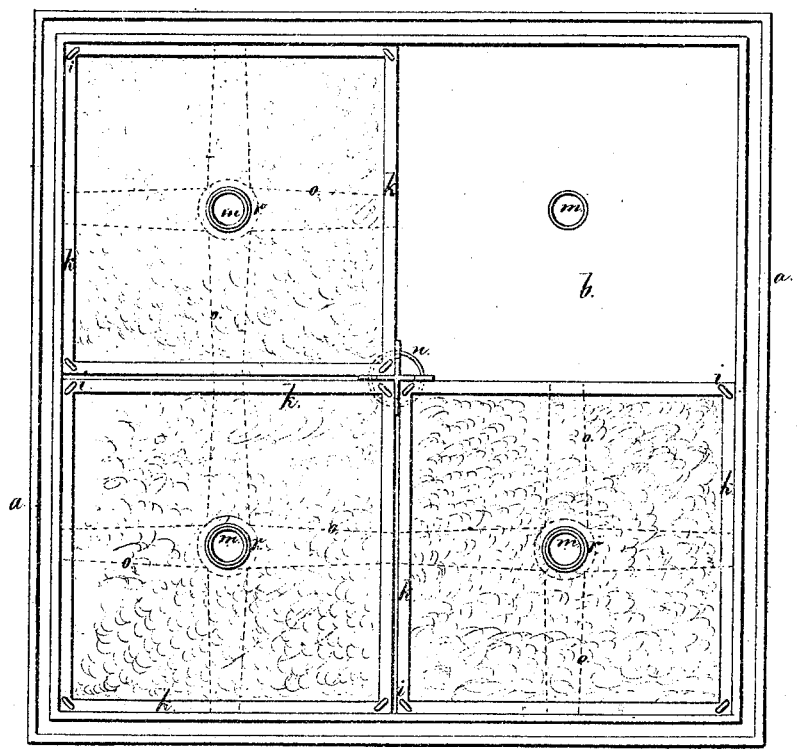

UNITED STATES PATENT OFFICE.

ALONZO F. HAVENS, OF BROOKLYN, NEW YORK.

IMPROVEMENT IN APPARATUS FOR PURIFYING GASES.

Specification forming part of Letters Patent No. 118,609, dated August 29, 1871.

*To all whom it may concern:*

Be it known that I, ALONZO F. HAVENS, of Brooklyn, in the county of Kings and State of New York, have invented and made an Improvement in Gas-Purifying Apparatus; and the following is declared to be a correct description of the same.

The object of this invention is to lessen the time and labor required to change the material in the pans of a purifying apparatus, and to avoid the injurious effects from the foul gas liberated in such apparatus, and the scattering or spilling of the contents of such apparatus in and around the same in the removing of the spent charge and the insertion of the refilled trays.

The trays of the purifier are united in nests and may be divided up into sections, two or more in number, according to the size of the apparatus, and the purifier is provided with a removable cover, so that the nests of trays can be lifted out of the apparatus. Extra nests of trays are provided and charged previous to opening the purifying apparatus, so that by a suitable hoisting mechanism the cover of the purifier can be removed and one nest or section after another lifted out, and newly-charged nests or sections inserted in their places. The nests of trays or sections charged with spent purifying material are to be taken away from the purifying-house or apparatus, and the material removed and the trays recharged ready for use.

This improvement effects a great saving in time, and the deleterious effects from noxious gases in the purifying-house are avoided, because the purifying material is not disturbed until taken away from the purifying apparatus, and the spent lime can be emptied in the open air and directly into a hopper leading to a closed vessel, thus avoiding to a large extent the most objectionable portion of the gas-making operation.

In the drawing, Figure 1 is a vertical section, and Fig. 2 is a plan of my purifying apparatus.

The inclosure for the purifying apparatus is made by the walls *a a*, bottom *b*, cover *c*, and rim *d*, passing into the water-packing around the upper edges of *a*. These parts are to be of any desired size or shape. The interior of this purifier, if large, is divided up into sections, so that the nests of trays may be of a convenient size for handling, with the usual appliance of a block and tackle or other convenient mechanism. I have shown four such sections. Each nest of trays or sections is made with a box or frame, *k*, receiving or containing the trays *l*. These trays are to be perforated, and of any desired material that is adapted to sustaining the lime or other purifying material and allowing the gas to pass up through the same. The sections or nests of trays are to be provided with suitable eyes *i i*, by means of which power can be attached for lifting out the nest or section containing the trays and spent material. The eyes or rings also serve for lowering into place the section or nest of trays charged with fresh purifying substances. The pipe *n* is the inlet allowing the gas to ascend and pass beneath the trays of the various sections, and by having this pipe nearly at the middle of the apparatus the distribution will be uniform; but I do not limit myself in this particular. The pipes *m*, for conveying away the gas, are shown as located centrally to each of the nests of trays or sections, so as to aid in equally distributing the gas; but I do not limit myself in this particular. When constructed in the manner shown the pipes *m* become convenient guides in lowering the sections to place, as the central sleeves *r* that set over said pipes *m* are attached in by the bottom cross-bars or frames *o o*, and one is fitted in each section or nest of trays. If the nests of trays or sections are made slightly the largest at the top and the insides of the purifying apparatus sloped accordingly the nests of trays will free themselves easily as lifted out.

I claim as my invention—

1. The purifying apparatus, made with nests of trays with purifying material and removable from said purifying apparatus when the cover is taken off, for the purposes and as specified.

2. The nests of trays, provided with the sleeve *r* that passes over the stand pipe *m* and guides the nest to its place, substantially as specified.

Signed by me this 17th day of July, A. D. 1871.

A. F. HAVENS.

Witnesses:
CHAS. H. SMITH,
GEO. T. PINCKNEY.